United States Patent
Ferrill

[15] 3,690,682
[45] Sept. 12, 1972

[54] HIGH PRESSURE SEALING MEANS

[72] Inventor: Homer E. Ferrill, Alexandria, La.

[73] Assignee: Dresser Industries, Inc., Dallas, Tex.

[22] Filed: May 18, 1970

[21] Appl. No.: 38,425

[52] U.S. Cl. .................. 277/102, 277/205, 277/235, 220/46 MS
[51] Int. Cl. ............................................. F16j 15/08
[58] Field of Search ..................... 277/102–106, 112, 277/113, 114, 117–121, 205, 235 A, 235; 220/46 MS

[56] References Cited

UNITED STATES PATENTS

| | | |
|---|---|---|
| 2,641,381 | 6/1953 | Bertrand .................. 277/235 A |
| 3,046,026 | 7/1962 | Burrows .................... 277/205 |
| 2,264,147 | 11/1941 | Dunlevy .................... 277/205 X |

FOREIGN PATENTS OR APPLICATIONS

| | | | |
|---|---|---|---|
| 985,295 | 3/1951 | France | .................... 277/205 |

Primary Examiner—William F. O'Dea
Assistant Examiner—Robert L. Smith
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A sealing means for providing a fluid tight joint between assembled components of valves adapted for high temperature-high pressure service. The sealing means is comprised of a metallic ring, V-shaped in radial cross section through its annulus and engaged at its outer apex by a similarly shaped recessed surface of an annular rigid follower. Forcing the follower axially against the ring spreadingly deforms the ring in a radial direction into a firm sealing engagement against opposing walls of adjacent components.

10 Claims, 6 Drawing Figures

INVENTOR
HOMER E. FERRILL

ATTORNEY

INVENTOR
HOMER E. FERRILL

ATTORNEY

INVENTOR
HOMER E. FERRILL

ATTORNEY

HIGH PRESSURE SEALING MEANS

BACKGROUND OF THE INVENTION

The field of art to which the invention pertains includes the art of joint packing for valves.

Construction of valves suitable for high temperature-high pressure service frequently require one or more seals for maintaining assembled joints pressuretight. Since any escaping fluid could present a serious hazard to local personnel, not to mention the adverse affect on the system of which it is a part, the seal and its ability to maintain a pressure tight joint represents a highly significant component in ensuring serviceability of the valve. For these reasons, gaskets or the like of generally resilient materials are regarded as unsuitable for this type service. At the same time, many joints which such seals are called upon to maintain are internally located between coaxial components assembled as by threading and providing an extremely narrow, confined, axially extending circular joint which is more difficult to maintain. A seal for the latter purpose is disclosed in U.S. Pat. No. 3,046,026 and while enjoying a high degree of commercial success it is generally regarded as expensive because of careful assembly and special machining required for the valve seating surfaces against which the seal must engage. Similarly, pipe lines for high temperature-high pressure likewise require adequate seals to ensure against leakage but because of more accessible and/or readily insertable seal location as in the coupling or flange, the problems associated therewith are not nearly as acute as in a valve assembly of a type referred to above. A seal for pipeline service is disclosed in U.S. Pat. No. 1,965,273.

SUMMARY OF THE INVENTION

This invention relates to sealing means for maintaining a fluid tight joint between assembled components of valves particularly adapted for high temperature-high pressure service. More specifically, the invention relates to certain specific improvements in sealing means providing a fluidtight seal at a joint such as formed between a hollow valve body, and an element such as a valve bonnet or bushing having a tubular portion passed through an opening therefor in the body and received telescopically threaded therein.

In accordance herewith a joint seal at the aforementioned location is formed by a thin walled, metallic seal ring substantially V-shaped in radial section as to form two spaced circumferential legs. The ring is first placed spanning the joint to be maintained with its legs overlying and facing concentric and adjacent annular shouldered channels or grooves in contiguous components between which the joint is located. For reasons as will be explained, the inner and outer legs are inclined radially inwardly and outwardly, respectively, at an angle of approximately 30° relative to a plane extending transversely of the ring axis. A follower ring, of more rigid mass than the seal ring, conforms and fits between opposing circumferential walls of the adjacent channels. The under axial surface of the follower ring is annularly grooved to engage against the apex of the seal ring. Application of an axially inward force against the follower ring, as by bolting an overflange or collar, causes the seal ring to spread radially diverging until firm uniform engagement against the opposite channel walls is achieved.

With the above arrangement the former expense associated with careful assembly and special machining for prior art seals is dispensed with. Instead, only ordinary assembly care and ordinary machining is required thereby substantially reducing costs attributed to this aspect of manufacture. Since assembly is less difficult than with prior seals, sealing is assured despite reassembly by less skilled field service personnel at customer locations.

It is therefore an object of the invention to provide an improved seal construction for high pressure-high temperature valves.

It is a further object of the invention to provide an improved seal as in the aforesaid object suitable for maintaining pressure tight joints internally located between coaxially assembled valve components.

It is a still further object of the invention to provide a seal as in the last mentioned object and which is substantially less costly to manufacture than are similar purpose seals of the prior art.

BRIEF DESCRIPTION OF THE DRAWINGS

Referring to FIGS. 1 and 2 of the drawings, the numeral 10 designates generally a globe valve of a type disclosed in aforementioned U.S. Pat. No. 3,046,026. The valve includes a body 11, having a rising stem 12, secured in place by means of a valve bonnet 13. The bonnet terminates at its lower end via a tubular portion 14 telescopically received in bore 15 whereat it is threaded to body 11. An annular radially enlarged flange 16 connects valve bonnet 13 to body 11 by means of bolts 17.

Referring now to FIGS. 3 and 4, the numeral 22 designates generally a pressure relief valve of a type more fully disclosed in U.S. Pat. No. 3,354,896. The valve includes a body or base 23 in which a bushing 24 has a tubular end portion 25 telescopically received in a bore 26 thereof. The bushing is secured by threads 27 to the body and has a valve seat 28 on its inner end. An annular radially enlarged flange 32, which corresponds to the flange 16 of FIGS. 1 and 2, is connected by bolts 33 to the body 23. In this instance flange 32 comprises one end of a discharge collar 34 surrounding the outer end 35 of the bushing 24. An opposite flange 36 is adapted for connecting the valve to a discharge fluid conduit (not shown). This arrangement permits the bushing to be removed from body 23 for inspection and/or servicing of valve seat 28.

Figure 1:
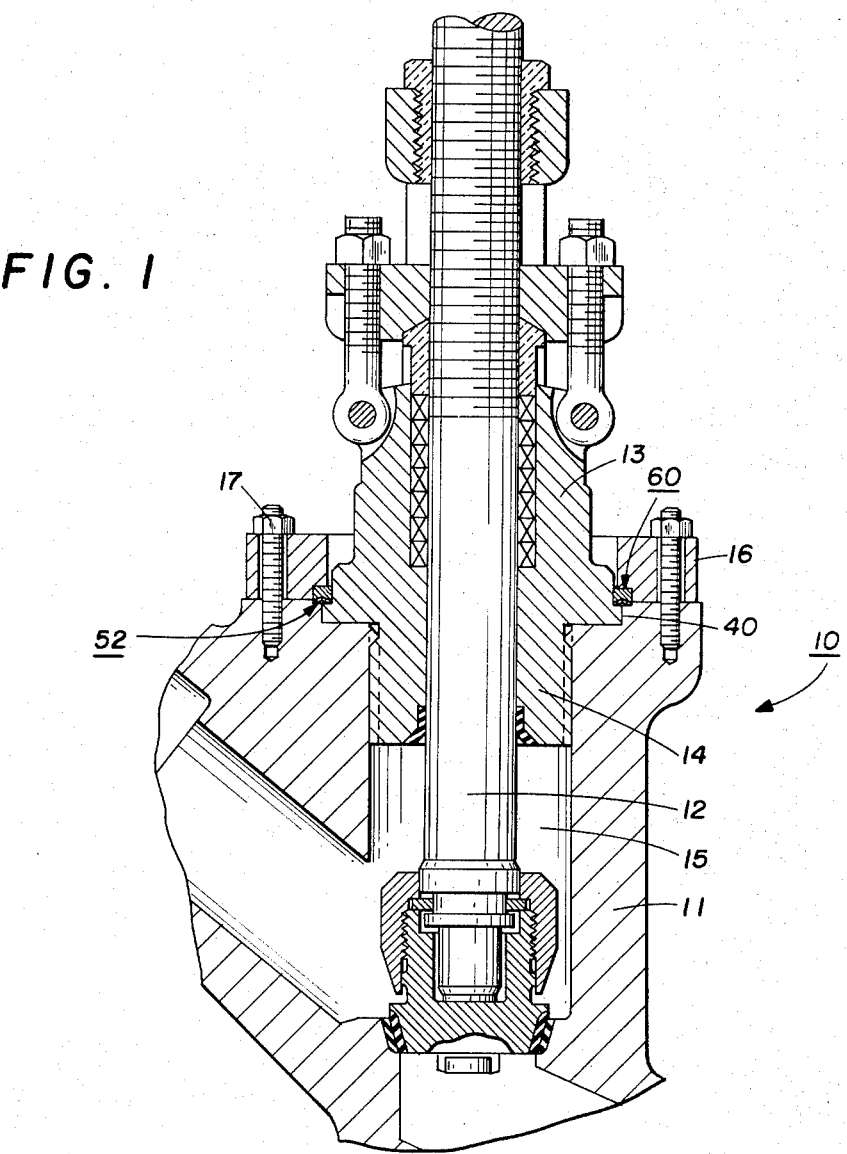
FIG. 1 is a vertical section through a globe valve of generally conventional type on the plane of the axis of the valve stem and illustrating the employment of a seal, according to the present invention, for sealing the joint between the valve body and bonnet.
Figure 2:
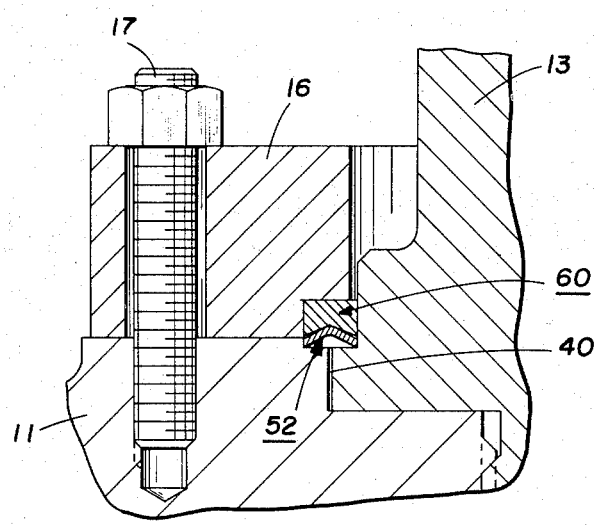
FIG. 2 is a fragmentary view of an enlarged scale showing a portion of the apparatus as illustrated in FIG. 1.
Figure 3:
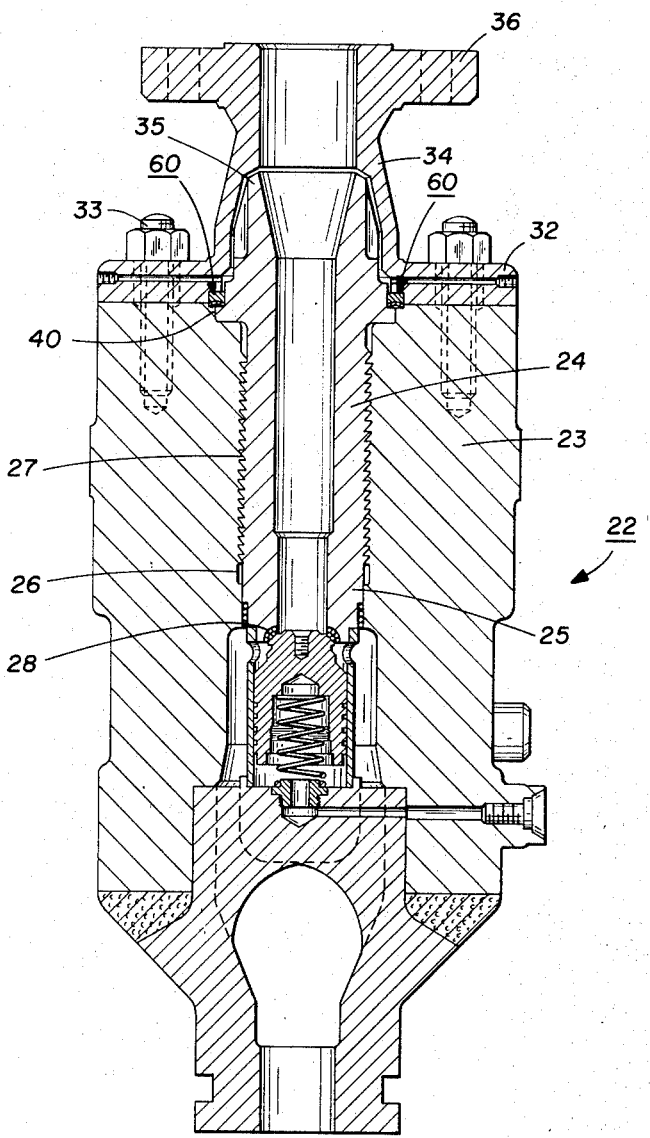
FIG. 3 is a vertical section similar to FIG. 1 through a safety relief valve of a commercially available type and illustrating the employment of a seal, according to the present invention, for sealing the joint between the valve base and telescopically received bushing.
Figure 4:
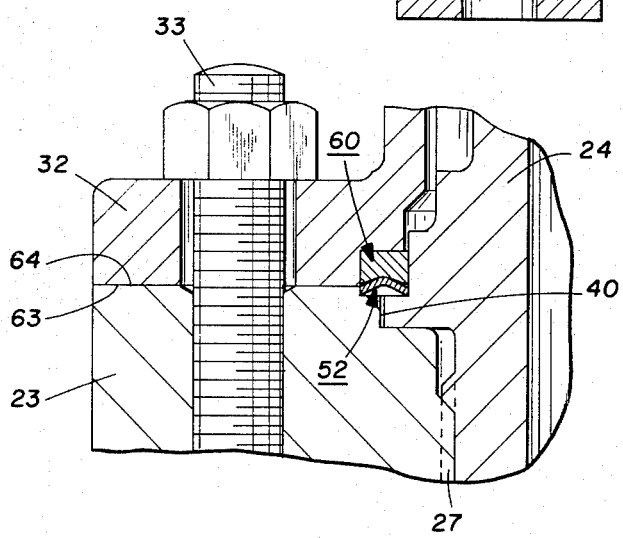
FIG. 4 is a view on an enlarged scale showing a portion of the apparatus illustrated in FIG. 3.

As can be best seen in FIGS. 5 and 6, there is shown the invention substantially as illustrated in FIGS. 1–4, and for the sake of explanation will be described in reference to the valve structure of FIGS. 3 and 4. In this instance, the joint to be sealed is represented by an axially extending annular opening 40 formed between juxtaposed walls 41 and 42 of contiguously assembled body 23 and bushing 24. Despite a close surface fit between these components the joint 40 is relatively in unsealed communication with pressurized fluid contained in bore chamber 26.

At the egress end of opening 40, body 23 and bushing 24 radially diverge in a coplanar relation to form annular right angle peripheral channels or grooves 43 and 44 including circumferential wall surfaces 45 and 46 respectively. Flange 32 likewise has a right angle annular channel or groove 50 at the juncture of its inner periphery with its inner face and including circumferential wall surface 51 axially coextensive with wall 45.

The sealing member hereof comprises a metal sealing ring 52 of preferably stainless steel and of thin wall on the order of about one-sixteenth inch in thickness. Ring 52 is substantially V-shaped in transverse section effecting an inner leg 54 diverging from an outer leg 55 and together merging at apex 56. The ring is placed inverted (apex up) with its legs facing the bottom of channels 43 and 44. Preferably, for reasons as will be explained, the legs when initially set in place are inclined radially inwardly and outwardly at an angle α of substantially 30° relative to a plane extending transversely of the ring axis. Contained within channel 50 is a follower ring 60 conforming generally to the bottom and sides thereof and including an annular or circumferentially grooved recess 61 on its underside. The recess 61 is V-shaped in section of less shallow inclination than that of ring 52 and acts as a die forming member when urged against apex 56 of the latter.

Figure 5:
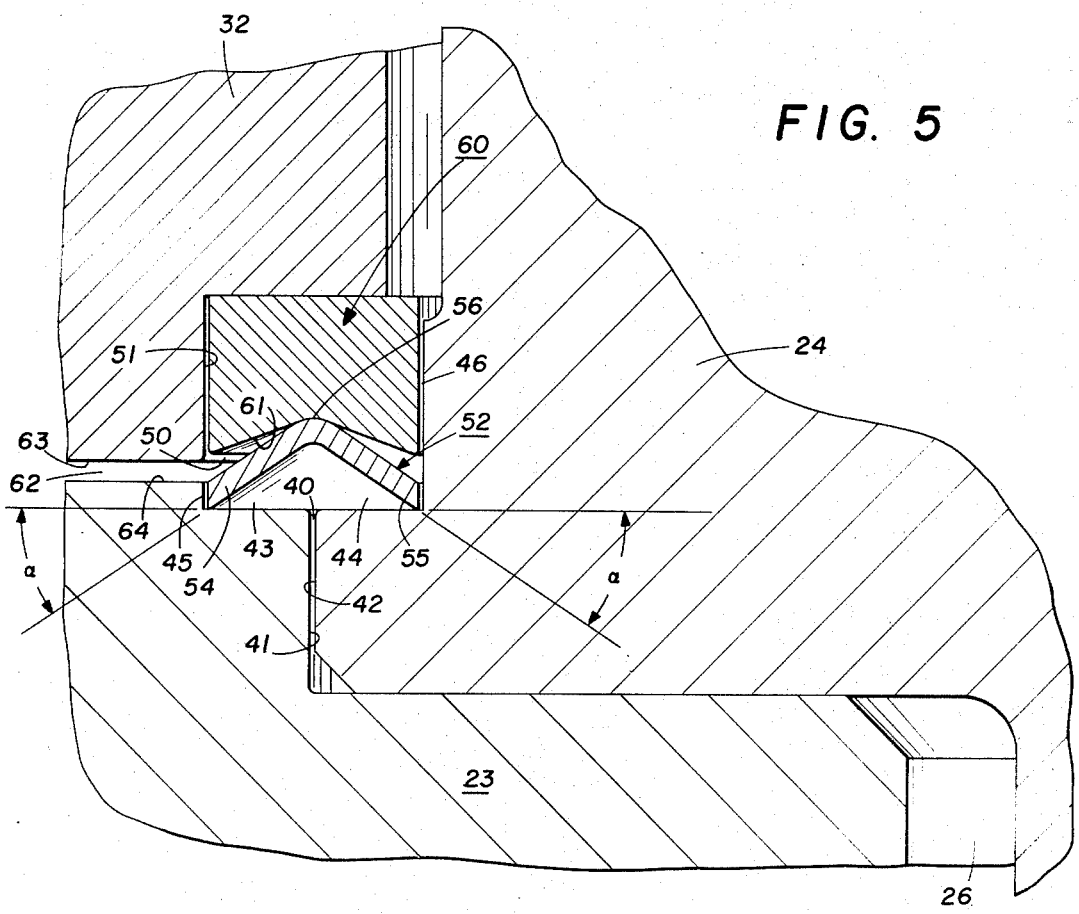
FIGS. 5 and 6 are views on a still further enlarged scale than FIGS. 2 and 4 showing the sealing ring for either above valve type in its normal, relaxed position and in its compressed position, respectively.
Figure 6:
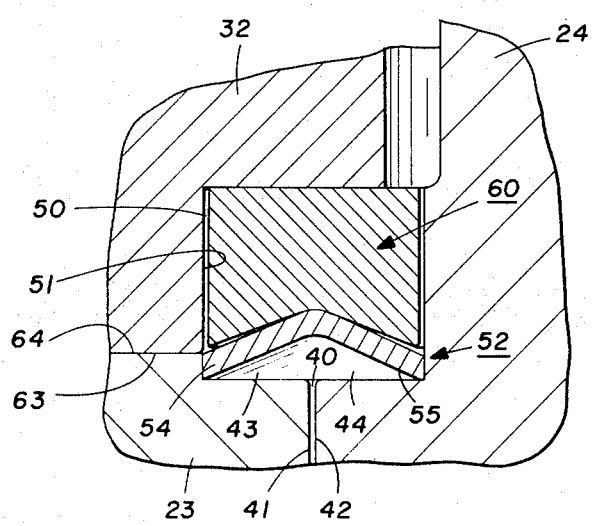

To form the seal, flange 32 is forced axially inward of the valve by tightening bolts 33 until the gap 62 shown in FIG. 5, disappears as the flange face 63 engages against the mating body surface 64 in the manner of FIG. 6. In so doing follower ring 60 is moved axially inward and acts to compress the sealing ring 52 causing it to spread radially inward at leg 54 and outward at leg 55. The spreading of ring 52 continues until bolts 33 are adequately torqued and the change which occurs with respect to ring 52 can be best appreciated by careful comparison of FIGS. 5 and 6. On achieving the relation of FIG. 6, the seal is completed with ring 52 in firm, uniform circumferential engagement against side walls 45 and 46. On disassembly for servicing or the like, ring 52 reverts to its initial condition.

By the above description there has been disclosed a novel sealing means for providing a fluid joint between assembled components of valves adapted for high temperature-high pressure service. The sealing means includes the simplicity of but a preformed V-shaped ring 52 of stainless steel or the like forced into spreading contact against concentric circumferential channel walls on each side of the joint to be maintained. Follower ring 60 serves as a spacer or washer to provide a suitable bearing surface for abutting engagement with the apex 56 of sealing ring 52 to assure proper alignment and prevent relative displacement thereof. With the novel design of sealing ring 52, the need for expensive maintenance procedures is avoided to insure an efficient, fluid tight joint. Ordinary machining of the parts is sufficient.

The 30° initial angle α for the leg inclination of ring 52 has been found to provide an optimum balance between bolting force applied at 33 and required sealing force exerted by the ring against the channel walls 45 and 46. As the angle is significantly increased beyond 30°, for example, 45°, the required bolting force to spread the ring is similarly increased while the sealing force exerted against the retaining channels is proportionally decreased. On the other hand, as the angle is substantially reduced to, for example, 15°, the sealing force is increased in comparison with the bolting force. Moreover, in the latter situation, the radial distance through which the two ring legs can move is likewise reduced thereby imposing a much closer degree of tolerance control in the manufacture of both seal ring and retaining channels.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a valve including a first component defining a tubular passage for flow of pressurized fluid, and a second component secured assembled to said first component coaxially of said passage forming an elongated joint therebetween which connects with said passage, the improvement comprising sealing means to maintain said joint pressure tight and comprising:
   a. means defining L-shaped coplanar opposite annular channels located to each side of said joint and extending toward each other for providing a common base between the side walls thereof;
   b. a stiffly resilient annular metallic seal ring generally V-shaped in cross section with legs angularly diverging from an apex, said seal ring being arranged spanning said joint toward said base with its apex in general coalignment with said joint and its legs diverging toward the walls of said opposite channels and adapted to cross sectionally terminate therewithin;
   c. a follower ring generally coextensive with said seal ring and having an angular surface relatively more shallow than said ring in uniform engagement against the apex thereof; and
   d. advance means operably engaging said follower ring at a location removed from the seal ring engaging surface thereof to advance said follower ring axially against said seal ring spreading the legs of the latter uniformly along said base into sealing engagement with the side walls of said channels.

2. In a valve according to claim 1 in which said joint has an axial extent and at termination is circular in section and the seal ring of the improvement is V-shaped in radial section through its annulus for overlying said joint.

3. The improvement according to claim 1 in which said seal ring is V-shaped in radial section through its annulus.

4. The improvement according to claim 3 in which said follower ring includes a circumferential groove in the angular surface with which it engages said seal ring.

5. The improvement according to claim 4 in which the legs of said seal ring are angularly inclined radially inward and outward the ring axis.

6. The improvement according to claim 4 in which said advance means includes bolts threaded into one of said components and means includes bolts threaded into one of said components and means moved by tightening of said bolts and engaging against said follower ring on a surface thereof opposite the surface in which said circumferential groove is contained.

7. Apparatus for sealing an annular joint in a pressure fluid container having a channel formed of a base intermediate substantially perpendicular side walls extending about said joint in fluid communication therewith comprising in combination:

a. a stiffly resilient annular metallic seal ring generally V-shaped in cross section with legs angularly diverging from an apex, said seal ring being adapted for receipt within said channel spanning the joint thereat with its apex in general coalignment therewith and its legs cross sectionally terminating against the channel base diverging toward and within the opposite side walls thereof; and b. a follower ring generally coextensive with said seal ring and having an angular surface relatively more shallow than said seal ring in uniform engagement against the apex thereof;

c. said seal ring being responsive to an axial force applied from said follower to spread its legs along said base into sealing engagement with the side walls of the container channel.

8. Apparatus according to claim 7 in which said seal ring is V-shaped in radial section through its annulus.

9. Apparatus according to claim 8 in which said follower ring includes a circumferential groove in the surface with which it engages said seal ring.

10. Apparatus according to claim 9 in which the legs of said seal ring are angularly inclined radially inward and outward about 30° to a plane transverse to the ring axis.

* * * * *